United States Patent
Demontmorency

(10) Patent No.: US 7,794,196 B2
(45) Date of Patent: Sep. 14, 2010

(54) GUIDE-CASE FOR WATER TURBINE

(76) Inventor: David George Demontmorency, 1220 Shouldice Side Road, Cambridge, Ontario (CA) N1R 5S5

( * ) Notice: Subject to any disclaimer, the term of this patent is extended or adjusted under 35 U.S.C. 154(b) by 653 days.

(21) Appl. No.: 11/573,653

(22) PCT Filed: Aug. 26, 2005

(86) PCT No.: PCT/CA2005/001291

§ 371 (c)(1),
(2), (4) Date: Feb. 13, 2007

(87) PCT Pub. No.: WO2006/021094

PCT Pub. Date: Mar. 2, 2006

(65) Prior Publication Data

US 2008/0145212 A1    Jun. 19, 2008

(30) Foreign Application Priority Data

Aug. 27, 2004  (GB) .................................. 0419151.6
Jan. 24, 2005  (GB) .................................. 0501382.6

(51) Int. Cl.
*F03B 11/02*  (2006.01)
(52) U.S. Cl. ........................ 415/4.3; 415/4.5; 415/8; 415/73
(58) Field of Classification Search ............ 415/2.1, 415/3.1, 4.3, 4.5, 8, 72–74
See application file for complete search history.

(56) References Cited

U.S. PATENT DOCUMENTS

| 1,722,438 | A | * | 7/1929 | Moody .................... 60/696 |
| 4,465,430 | A | | 8/1984 | DeMontmorency |
| 5,167,483 | A | | 12/1992 | Gardiner |
| 5,679,037 | A | | 10/1997 | Rieben |
| 6,835,043 | B2 | | 12/2004 | Milan et al. |
| 6,881,031 | B2 | | 4/2005 | Nomura |
| 2003/0223857 | A1 | | 12/2003 | Milan et al. |

FOREIGN PATENT DOCUMENTS

| DE | 747919 | 5/1943 |
| WO | WO 02/04808 | 1/2002 |

\* cited by examiner

*Primary Examiner*—Edward Look
*Assistant Examiner*—Jesse Prager
(74) *Attorney, Agent, or Firm*—Anthony Asquith Corp.

(57) ABSTRACT

Guide case (24) for use in conjunction with a water turbine (20), with a helical top wall (35) of the annular chamber (27) extended downstream of the inner wall (39) of the inlet port (30). The extension is wetted on its downstream side by the top water entering the inlet port, and on its upstream side by the bottom water. The extension serves to keep the top water separate from the bottom water until the velocity vectors of the two water streams have been aligned, therefore reducing turbulence at the point where the waters mix and merge, and enabling more of the energy to be extracted from the water.

13 Claims, 5 Drawing Sheets

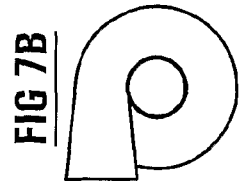
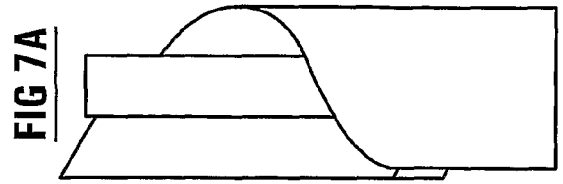
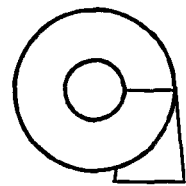
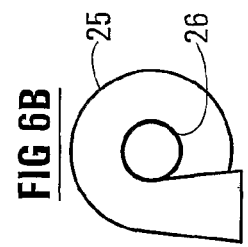
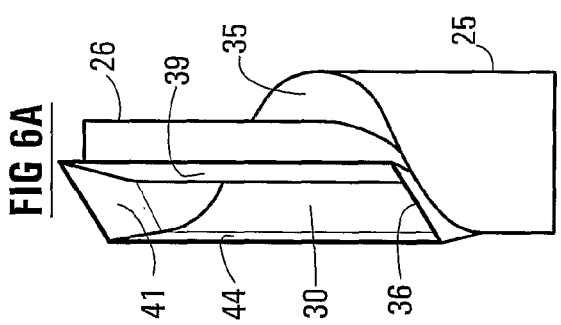
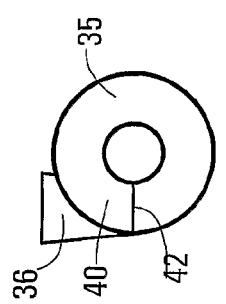
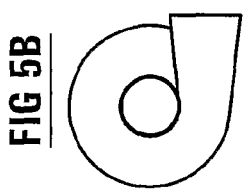
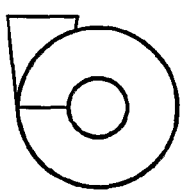
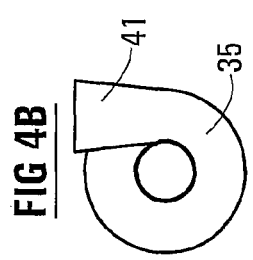
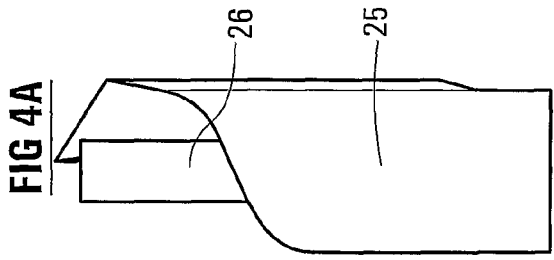
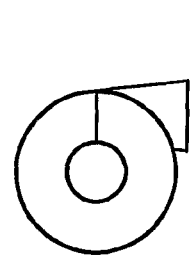

US 7,794,196 B2

GUIDE-CASE FOR WATER TURBINE

This invention relates to turbines of the kind used to drive a generator in a hydro-electric installation.

BACKGROUND TO THE INVENTION

Attention is directed to patent publication U.S. Pat. No. 4,465,430. The present invention represents an improvement to the technology described therein.

In an axial-flow (propeller-type) turbine, water enters and leaves the blades with little or no radial component of motion in passing through the blades. In passing through the propeller blades, however, the water does undergo a rotational displacement. The energy for providing the rotational velocity is, of course, derived from the mechanical energy contained in the water; and ideally there should be no rotational velocity in the water leaving the turbine.

As described in the said U.S. Pat. No. 4,465,430, the incoming water can be fed through a guide-case, which is shaped to impart a rotational (or rather, helical) velocity to the water. Thus, a rotational component is imparted to the overall velocity of the incoming water. It was found that shaping the guide-case so as to impart this extra rotational velocity enabled more of the energy of the incoming water to be converted into electricity.

The maximum possible rate at which energy can be extracted from the incoming water is the product of the pressure and the volumetric flowrate (PV) of the water; providing the guide-case enables more electricity to be generated from a given water PV. The energy for creating the rotational velocity of course can only be derived from the PV of the water in the headrace, and creating the rotational velocity must drain some energy from the water; but the effect, overall, is to enable more of that energy to be fed into the turbine shaft, and to enable the water in the tailrace to be more nearly completely spent.

In the guide-case shown in FIGS. 1 to 6 of U.S. Pat. No. 4,465,430, water enters the turbine blades 32 (using the numerals of that publication) through a turbine chamber 21. The turbine chamber has an annular configuration; its inner diameter is the turbine shaft 33 (or rather, its inner diameter is the sleeve 25 around the turbine shaft), and its outer diameter is the outer casing 24 surrounding the turbine blades 32.

In '430, the headrace 16 containing the incoming water is of a long-by-narrow shape. This headrace is disposed with its long length parallel to the axis of the turbine. The narrow width of the headrace occupies the radial annular width of the annular chamber. The far end wall 18 of the headrace rectangle blends into a helical wall 26. This helical wall completes (almost) one complete turn around the inner sleeve 25.

In '430, the effect is that the far water stream, which enters the annular chamber from the far end of the rectangular headrace, travels axially along the annular chamber and in doing so completes one rotation around the annulus; this water then meets and mixes with the near water stream, which has just entered the annular chamber from the near end of the long-by-narrow headrace.

It will be understood that the near and far waters are not two separate streams: rather, they are the near and far ends of the single stream that is entering the turbine from the headrace. It may be regarded that the headrace stream wraps itself around the turbine shaft, and the near and far ends of that stream blend into each other in order to form the complete annulus of water that enters the annular chamber.

Ideally, the near water, which enters the annular chamber from the near end of the headrace, should perfectly match the far water, which enters from the far end, and which has already completed one revolution of the annular chamber. That is to say, the near water and the far water should match each other, at the point where they intersect, as far as their rotational velocities are concerned.

In '430, as a matter of fact, the problem arises that the near and far waters did not match very well. The present invention is aimed at improving the match. The improvement means that the turbulences and cross-currents arising from the mismatch between the two water-streams are eliminated, or reduced, with a consequent improvement in energy efficiency. It is recognised, in the invention, that the near and far water-streams can be induced to match each other more closely, leading to a desired improvement in efficiency, simply by making a rather modest change in the structure of the guide-case.

GENERAL FEATURES OF THE INVENTION

In the present invention, the guide-case includes an extension to the helical far wall of the annular chamber. The extension extends beyond an inner-wall/far-wall intersection in a downstream direction, helically towards the turbine. The extension is wetted on its upstream side by the near water entering the annular chamber from the near end of the inlet port, and is wetted on its downstream side by the far water entering from the far end of the inlet port.

DETAILED DESCRIPTION OF PREFERRED EMBODIMENTS

By way of further explanation of the invention, exemplary embodiments of the invention will now be described with reference to the accompanying drawings, in which.

Figure 3:
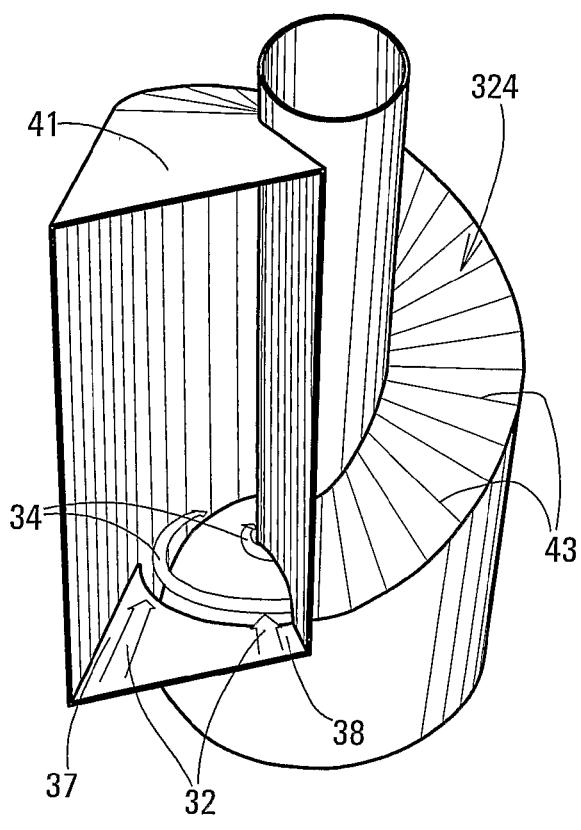

FIG. 3 is a corresponding view of a guide-case constructed according to U.S. Pat. No. 4,465,430.

Figure 2:
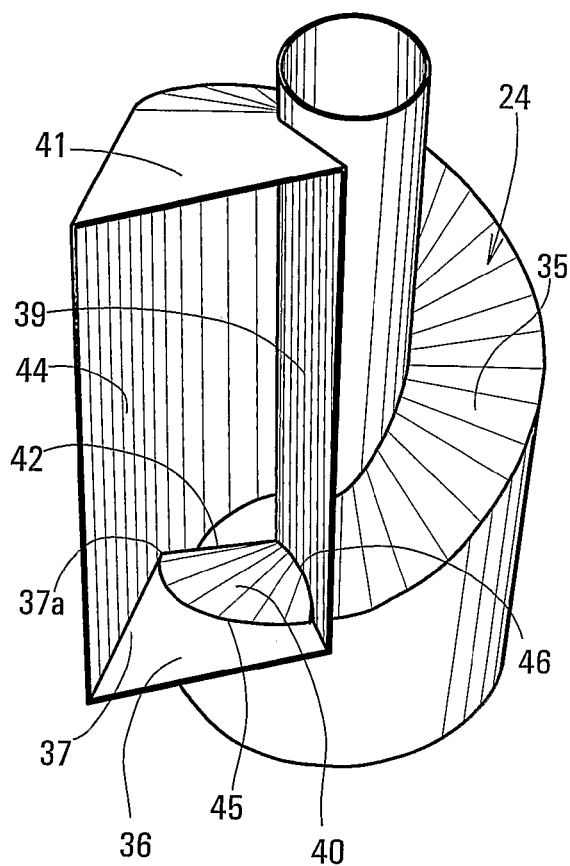
FIG. 2 is a pictorial perspective view, from the front and from above, of the guide-case included in FIG. 1.
Figure 3A:
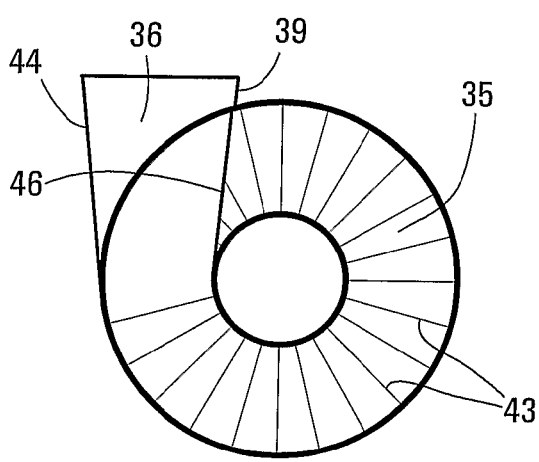
Figure 2A:
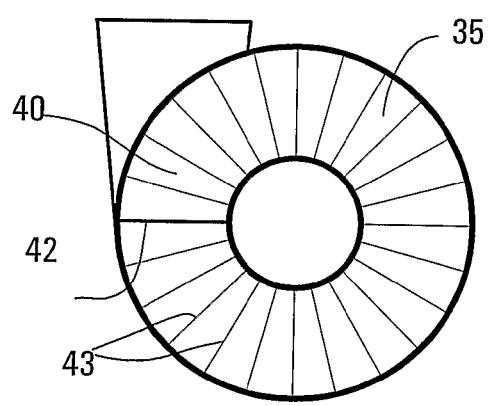

FIGS. 4a,5a,6a,7a respectively show back, left, front, and right, elevations of the guide-case of FIG. 2.

FIGS. 4b,4c,5b,5c,6b,6c,7b,7c are third-angle projections of the FIGS. 4a,5a,6a,7a views.

Figure 8:
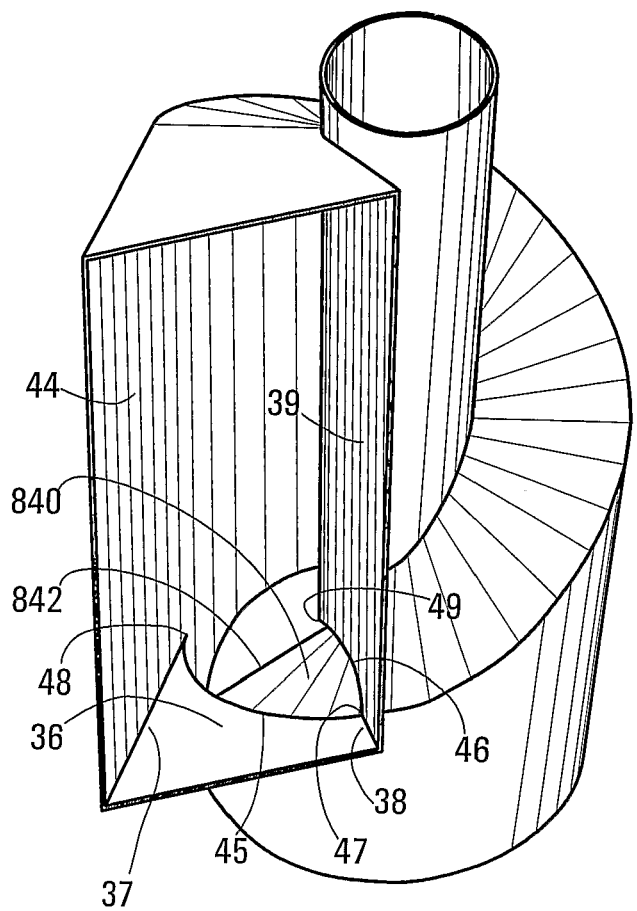

FIG. 8 is a view similar to FIG. 2, showing an alternative guide-case.

Figure 8A:
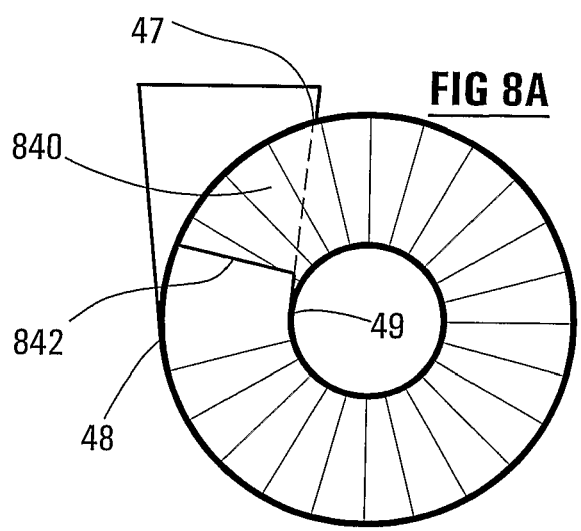

FIG. 8a is a view from underneath the guide-case of FIG. 8.

FIGS. 9-12 are corresponding views from underneath four further guide-cases.

Figure 13:
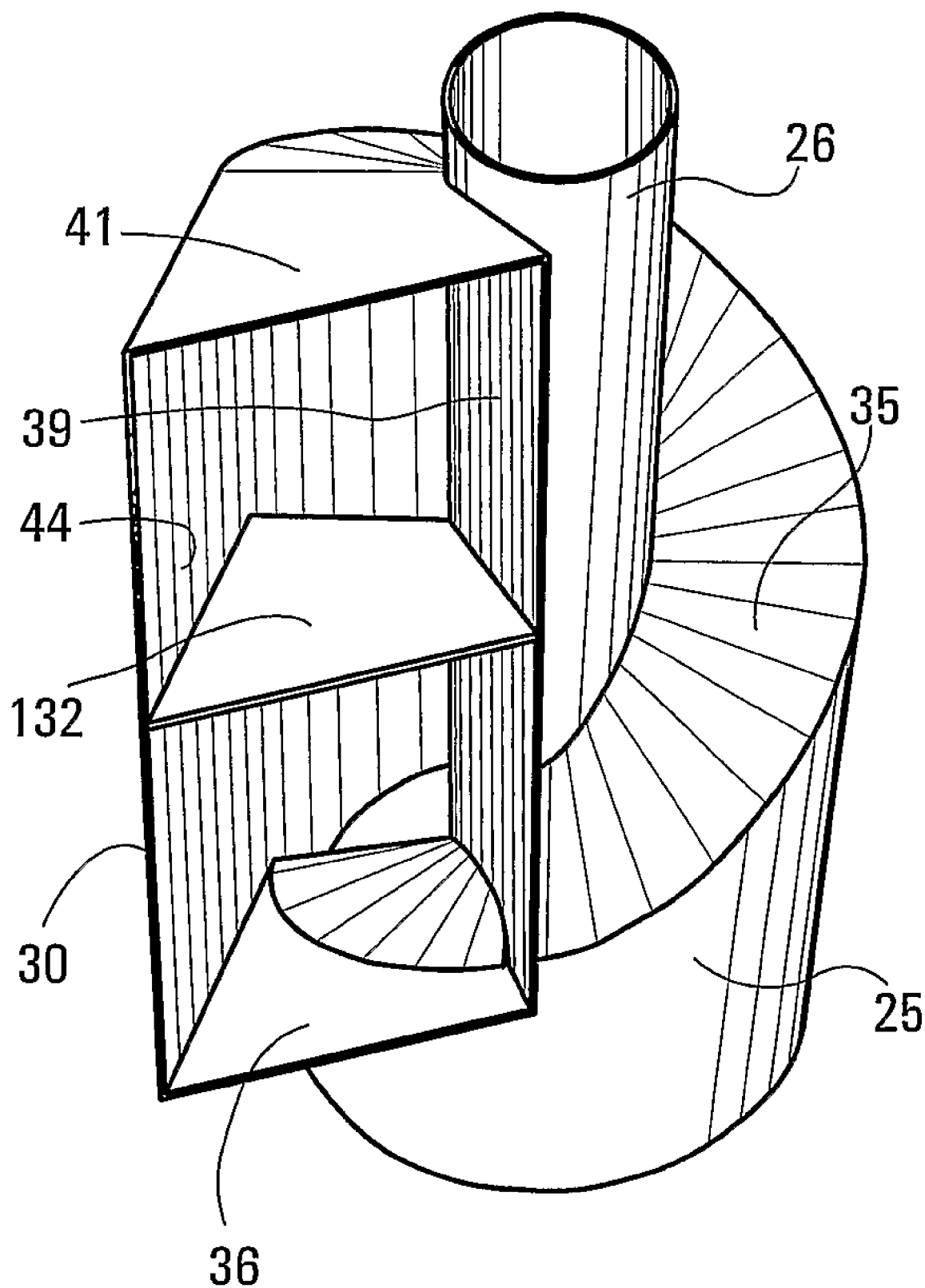

FIG. 13 is a view like FIGS. 2,3,8 of another modified guide-case.

The apparatuses shown in the accompanying drawings and described below are examples which embody the invention. It should be noted that the scope of the invention is defined by the accompanying claims, and not necessarily by specific features of exemplary embodiments.

Figure 1:
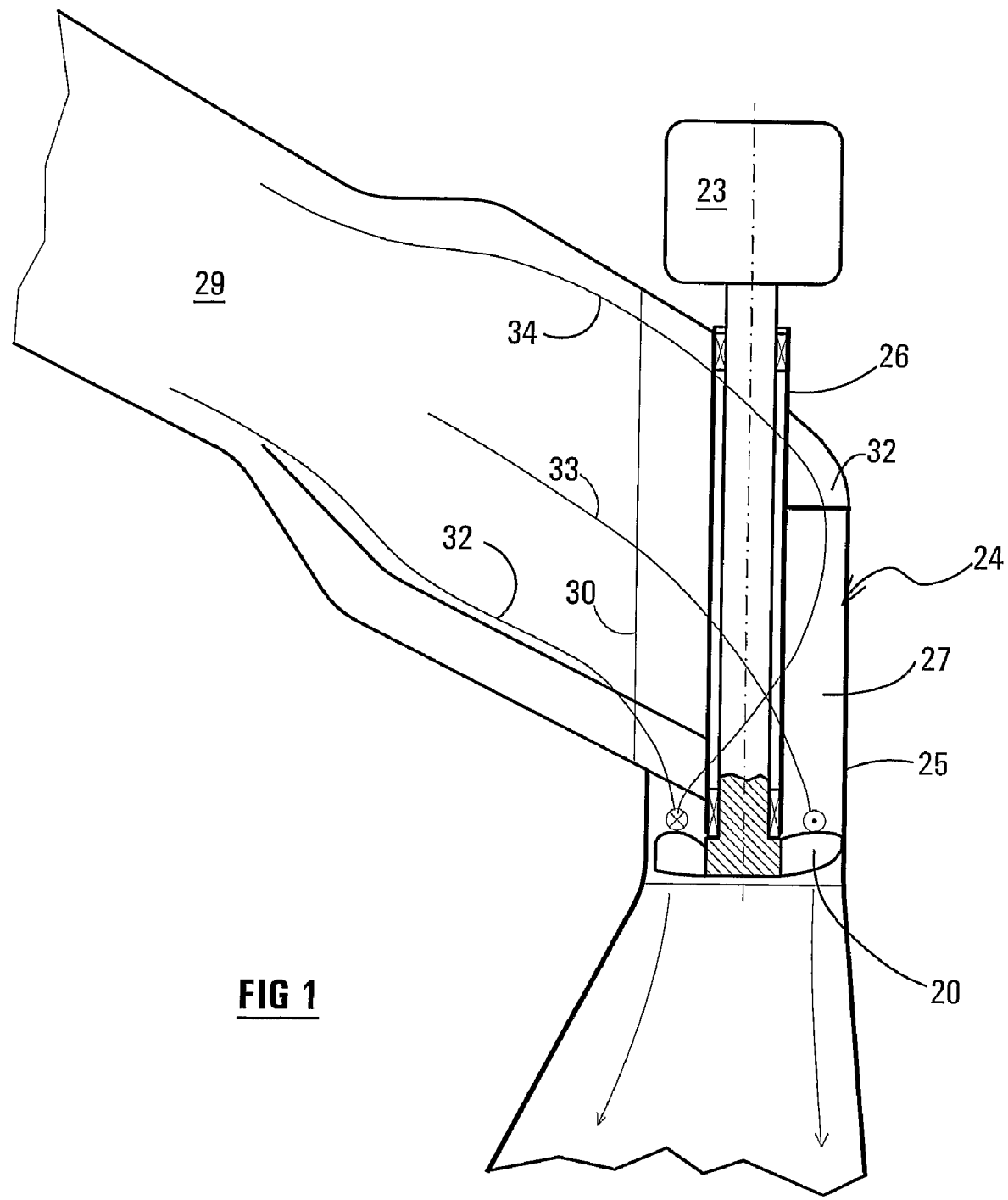
FIG. 1 is side elevation of some of the components of a hydro-electric installation, including portions of the headrace and tailrace, and including a guide-case that embodies the present invention.

FIG. 1 shows some of the components of a small hydro-electric installation. In the particular case as illustrated, the turbine 20 is 1.5 metres in diameter, with a hub 0.5 metres diameter. (The hub-to-tip ratio is usually in the range 3:1 to 2:1.) The turbine is capable of generating about five hundred kilowatts of electricity when coupled to a generator 23. Water flows through the turbine at a rate of about 3½ cu.m per second, at a pressure head of ten metres.

Water enters the turbine blades 20 having passed through guide-case 24. The guide-case 24 is shown in FIG. 2, and includes a cylindrical outer tube 25 and a cylindrical inner tube 26. The diameters of these tubes correspond to the outer and inner diameters of the blades 20. The annular chamber 27 defined between the outer tube 25 and the inner tube 26.

Headrace 29 conducts water under pressure from the headwaters in the water storage reservoir. The headrace 29 is typically cylindrical over most of its length, but then takes on a long/narrow slot form, as shown in FIG. 1, as it nears inlet-port 30 of the guide-case 24. In the example shown, the long length of the inlet port 30 is 2.7 metres, and the narrow width is 0.6 metres.

The guide-case 24 provides a transition between the long/narrow slot form of the inlet-port 30 and the annular chamber 27.

The water entering the annular chamber 27 from the bottom end of the inlet port 30 (termed the bottom water 32) may be compared with water entering from the top end of the inlet port (termed the top water 34). The top water 34 has traveled further, axially, than the bottom water 32, and the top water 34 has also undergone one rotation or turn around the axis of the annular chamber 27. Thus, the top water 34 has already completed (almost) one turn of the annular chamber 27 when the bottom water 32 starts to enter the annular chamber.

That is to say, near the bottom or downstream end of the guide-case 24, the top water 34 has already started to rotate, i.e. the top water 34 has acquired a circumferential or rotational component of velocity. However, the bottom water 32, which is just entering the guide-case, has not yet started to rotate.

The middle water 33 goes to the diametrally opposite side of the guide-case from the bottom and top waters, and does not mix with either.

FIG. 3 shows the structure a guide-case 324 might have if it were constructed according to U.S. Pat. No. 4,465,430. In FIG. 3, the (already rotating) top water 34 is shown emerging from underneath the (helical) top-wall 35 of the annular chamber. (In FIG. 3, the helical top-wall 35 ends where it intersects with the inside wall 39 of the inlet port, i.e. there is no extension to the helical top-wall 35.) FIG. 3 also shows the bottom water 32 entering the annular chamber, flowing along the bottom wall 36 of the inlet port.

It will be apparent that, in FIG. 3, there is a considerable mismatch between the directions of the velocity vectors of the two water streams 32,34. The situation is not too bad towards the radially-outer side 37 of the bottom wall 36, where the top water's rotation vector lies almost in line with the bottom-water's linear vector. But towards the radially-inner side 38 of the bottom wall 36, the two vectors meet almost at a right angle. This mismatch in velocities causes interference between the two flows, resulting in turbulence, and a loss of energy. (The lost energy goes to heat the water, of course, and is no longer available as mechanical energy for driving the turbine.)

FIG. 2 shows the guide-case 24, which has been designed according to the present invention. Here, the helical top-wall 35 of the annular chamber has been continued downstream of the inner wall 39 of the inlet port 30, to form an extension 40. The extension 40 may be regarded, not only as an extension of the helical top-wall 35 of the annular chamber 27, but also as an extension of the bottom wall 36 of the inlet port.

It is desirable that the top and bottom water streams 32,34 should match each other, as exactly as possible as to both linear and rpm velocity vectors, at the moment and point of contact. The presence of the extension 40 makes sure the velocity vectors of the merging streams lie at least approximately in the same direction over the whole width of the bottom wall 36 of the inlet port. That is to say, the extension 40 ensures the two streams do not meet until they are both moving in the same direction, preferably over the whole width of the inlet port.

Once the bottom water 32 and the top water 34 have merged and combined, now all the water in the annular chamber 27 proceeds forward towards the turbine blades 20. Desirably, the top water is now indistinguishable from the bottom water, whereby both streams of water have the same axial and rpm velocity profile.

It will be noted that, if every drop of water in the rotating body of water has the same angular velocity, the body would then be rotating as if it were a rotating solid. It might be considered that solid-body rotation of the water would be ideal, in propeller-type turbine installations; however, usually, it is preferred that the turbine-outside-water (i.e. the water passing through the radially outer regions of the turbine blades) be rotating at a slower rpm or angular velocity than the turbine-inside-water. It can be difficult to design turbine blades that will extract energy efficiently from water having a low velocity (and correspondingly high hydrostatic pressure); and, with solid-body rotation (in which every drop of water has the same rpm), the water entering the inside of the turbine may be moving too slowly for efficient energy transfer. If the rpm profile from outside-water to inside-water is such that the inside-water has rather more velocity and rather less pressure than would be the case with solid-body rotation, it becomes easier to design blades that will efficiently extract the energy from that inside-water. Thus, in the as-described typical case, where the turbine is set to rotate at 250 rpm, the designer should consider setting the turbine-inside-water to rotate also at 250 rpm, and setting the turbine-outside-water to rotate at say 180 rpm.

It is recognised that the reduced turbulence attributable to the presence of the extension 40 means that careful attention to flow engineering can now be expected to accomplish more worthwhile improvements in efficiency and performance, whereby significantly more of the pressure-flowrate power of the water can be extracted, and turned into mechanical power at the turbine shaft. It is recognised also that this performance enhancement can be realised in the form of greater flexibility of design, whereby a given turbine installation can be engineered to achieve commercially improved levels of efficiency, over a greater range of variations in pressure and flowrate than hitherto.

As described, the guide-case 24 imposes a vigorous rotation rpm to the water entering the turbine; the bottom water enters the turbine more or less directly, while the top water has undergone a complete turn around the turbine axis before it enters the turbine; and the extension 40 ensures that, where the two water streams meet, they do so with a minimum of mismatch-induced turbulence.

The extension 40 does not play any part in confining or containing the water passing through the annular chamber 27. (As shown by FIG. 3, the water would still be contained even if the extension were not present.) Rather, the extension serves to keep the top water separate from the bottom water, and to delay the point at which the two water streams meet until their velocity vectors are aligned in the same direction.

Thus, it is a characteristic of the extension 40 to the top-wall 35 (but not of the top-wall 35 itself) that the extension 40 is wet on both sides. The over-side of the extension 40 (i.e. the side that is visible in FIG. 2) is wetted by the bottom water, whereas the under-side of the extension 40 is wetted by the top water. By comparison, only the under-side of the top-wall 35 itself is wet, being wetted by the top water—the (visible) over-side of the top-wall 35, being outside the annular chamber 27, is dry.

The extension 40, although it need not be made of sheet metal, should at any rate be thin. The guide-case 24 of FIG. 2 is fabricated from sheet metal, and so has the same shape outside as inside. But a guide-case can be made in other ways—by laying-up around a mould, for example—in which case the outside shape might not conform to the inside shape. In particular, the extension 40 as shown in FIG. 3 has the same shape of the square thread form on its over-surface as on its under-surface, but only because it is made of sheet metal. If the extension were thick, that would reduce the cross-sectional area of the annular chamber; as to the walls that are wetted on one side only, it does not matter how thick they are.

The drawings FIGS. 4a,5a,6a,7a respectively show back, left, front, and right, elevations of the guide-case 24. (The FIG. 2 view is from the front, and from above.) The views shown in FIGS. 4b,4c,5b,5c, 6b,6c,7b,7c are third-angle projections of the FIGS. 4a,5a,6a,7a views. The top end wall 41 of the inlet port 30 may be regarded as an upward extension of the helical top-wall 35.

The extension 40 has a downstream extremity or edge 42. In the guide-case as shown in FIG. 2, this downstream edge lies on a normal radius of the annular chamber 27. That is to say, the downstream edge 42 lies on a line that passes through the common axis of the tubes 25,26, and is at right angles to that axis.

The top-wall 35 of the annular chamber 27 is helical. Using screw-thread terminology, the helical top-wall 35 has a ninety-degree flank angle; i.e. the thread is a square thread. Thus, each shading line 43 on the top-wall 35 is a normal radius of the tube axis, and the downstream edge 42 is simply the last (i.e. most downstream) one of those lines. Preferably, as shown, the downstream edge 42 of the extension 40 lies on the normal radius that passes through the downstream corner 37A of the outer side 37 of the bottom wall 36 of the inlet port 30.

It is not essential that the downstream edge of the extension be on that particular normal radius, nor indeed that the downstream edge lie on an actual radius at all. FIGS. 8-12 show some variations as to the shape and location of the downstream edge.

In FIG. 8, the extension 840 has its downstream edge 842 some way upstream of the line of the edge 42 in FIG. 2. FIG. 8a shows the guide-case of FIG. 8 from underneath. The important parameters include the bottom-end-wall/outer-tube intersection 45, and the inner-wall/top-wall intersection 46. The upstream end of the bottom-end-wall/outer-tube intersection 45 and the upstream end of the inner-wall/top-wall intersection 46 are located both at the point 47. The downstream end of the bottom-end-wall/outer-tube intersection 45 is located at 48, and the downstream end of the inner-wall/top-wall intersection 46 is located at 49. The point 48 lies on the bottom-end-wall 36, the outer-tube 25, and the outer wall 44, and the point 49 lies on the top-wall 35, the inner-tube 26, and the inner wall 39.

As shown in FIGS. 8,8a, placing the downstream edge 842 of the extension 840 upstream of the line shown in FIG. 2 is less preferred, because now the top and bottom water streams will not be in quite such advantageous velocity alignment when they meet and mix.

It might be more important for contact between the top and bottom streams rather to be delayed towards the radially inner side 38 of the bottom wall 36 than towards the radially outer side 37 of the bottom wall, because (as was shown in FIG. 3) it is at the inner side 38 that the mismatch of velocities of the two streams is at its worst. On the other hand, the speed of the rotating top stream is greater towards the radially outer side 37, so any mismatch of velocity magnitudes is likely to be greater at that location.

Figure 9:
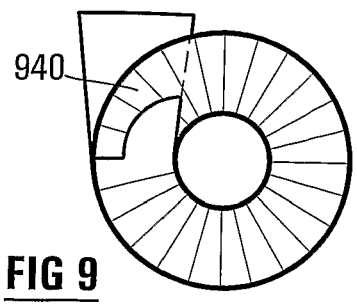
Figure 10:
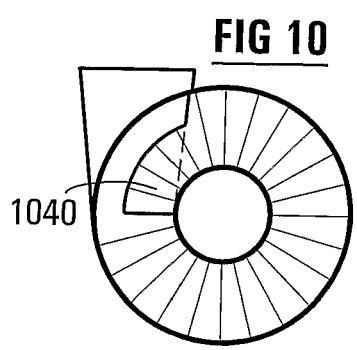

In FIG. 9, contact between the streams is delayed until at least the worst of the mismatch has been passed, whereby the extension 940 in FIG. 9 would be almost as good as that in the preferred FIG. 2 configuration. By contrast, the extension 1040 in FIG. 10 is almost useless, in that the mismatched streams have mixed and merged—turbulently—long before they reach the extension 1040.

Figure 11:
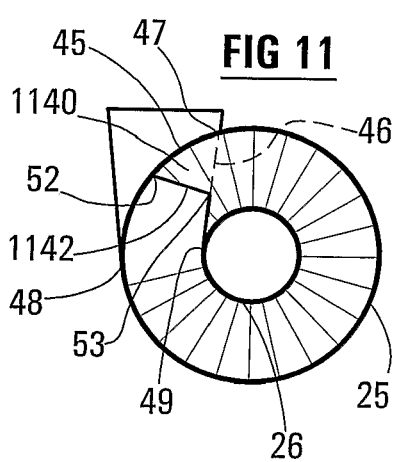

For the purposes of the invention, an extension that does not at least cover the area shown by the extension 1140 in FIG. 11 is more or less unable to produce any commercially-worthwhile effect in reducing turbulence caused by the meeting of the top and bottom waters. The downstream edge 1142 in FIG. 11 extends from point 52 to point 53. The point 52 is on the bottom-end-wall/outer-tube intersection 45, halfway between the inner wall 39 of the inlet port and the outer wall 44, i.e. halfway between the points 47 and 48. The point 53 is on the inner-wall/top-wall intersection 46, halfway between the outer tube 25 and the inner tube 26, i.e. halfway between the points 47 and 49.

Figure 12:
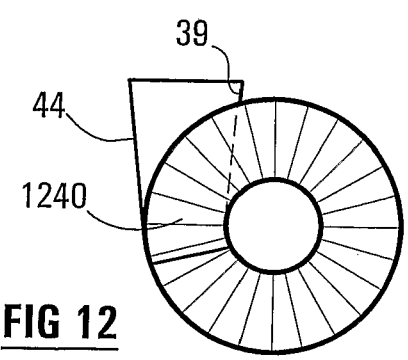

As shown in FIG. 12, it is also possible to continue the extension of the helical top-wall 35 further downstream than the edge 42 in FIG. 2, i.e. further downstream than the normal radius that passes through the downstream end of the bottom-end-wall/outer-tube intersection 45. The longer the extension 1240, the more the top and bottom water streams may be expected to be fully aligned as to the directions of their velocity vectors by the time they meet and merge. On the other hand, contact of the water streams with the extension causes friction, which not only imposes a direct loss but also means that water entering the turbine having just been in contact with the extension may be moving at slower magnitude of velocity than the rest of the water entering the turbine.

Normally, the designer will seek to place the turbine blades 20 very closely downstream of the guide-case 24. Making the annular chamber 27 longer than it needs to be would be inefficient, due to the friction of the water rotating against the inside of the outer tube 25. But if, in some cases, e.g. due to the lie of the land, the turbine has to be placed some distance downstream of the guide-case, i.e. if the annular chamber 27 is extended downstream, in that case the extension preferably should also be extended downstream.

As mentioned, the extension is wetted on both sides, and the function of the extension does not include containing or sealing the water. Thus, small holes in the extension would not matter. The function of the extension is to keep the top water and the bottom water from meeting and mixing and merging until their velocity vectors have become aligned. Large holes in the extension are holes that inhibit this function; small holes do not.

As shown, the lead angle or helix angle of the helical top-wall 35 (and of its extension 40) is constant along the full length thereof. (In the example, the lead angle is thirty degrees.) Constancy is not essential, and the designer may prefer to provide a progressively steepening helix angle further downstream, which might serve to make the creation of rpm in the water streams slightly more efficient. Similarly, the flank angle may be some angle other than a right angle, and if so the flank angle may be smaller or larger than a right angle. Varying the flank angle varies the relative volumetric flowrate of the water entering the radially-outer regions of the turbine versus the radially-inner regions.

The designer should see to it that any changes in the helix and flank angles are done gradually and smoothly, and should ensure generally that the water streams are not beset by tight corners, steps, nooks and crannies, etc. Also, generally, the passages through which the water flows just prior to entering the turbine should have a gradually reducing cross-sectional flow area, while the headrace and inlet port should be generously dimensioned, so that the water speeds up only at the last moment.

FIG. 13 shows a modification, in which a spacer 132 has been added into the rectangular inlet port. (More usually, as here, the inlet port 30, rather than being strictly rectangular, is parallelogram-shaped; however, the use herein of rectangular should be construed as including such variations.) The spacer 132 straddles between the outer wall 44 and the inner wall 39 of the inlet-port.

The purpose of the spacer 132 is to brace the two walls 44,39 of the inlet port into their correct spacing relative to each other. The inlet port 30 is very markedly of a long-by-narrow configuration, whereby, if left unbraced, there might be a tendency for the walls 44,39 to bow or bend, and perhaps buckle, either inwards or outwards. The headrace 29 is cylindrical upstream of the inlet port, and a cylindrical form is, of course, inherently much more rigid than a long, thin rectangle, although braces can be provided also in the headrace, if desired. Also, braces can be provided between the outer tube 25 and the inner tube 26 of the annular chamber 27, although here again cylindrical tubes inherently have a good resistance to distortion and buckling.

The spacer 132 should preferably extend over the whole length of the long-by-narrow portion of the inlet port. As mentioned, usually it need not be extended upstream into the headrace, nor downstream into the annular chamber.

The spacer is there as a mechanical spacing aid. The spacer is not required to be a seal, and it can be perforate if desired. The spacer should be so positioned and oriented as to be as nearly invisible as possible to the flow of water.

Alternatively, there may be two, or more, spacers disposed side by side along the long length of the inlet port.

As shown in the drawings, the axis of the turbine (and of the guide-case) is vertical, and the water flows downwards, but the arrangement may be orientated differently. In another orientation, and generally, the top end is rather termed the far end, and the bottom end the near end, relating near and far with respect to the turbine.

The invention claimed is:

1. Apparatus combining a water turbine and a guide-case, wherein:
   the turbine is an axial-flow propeller-type turbine;
   the turbine includes a rotor having a set of turbine blades, the blades having an inner diameter and an outer diameter;
   the guide-case includes an annular chamber, having an inlet port fed with water from a headrace;
   the annular chamber has an annular cross-section, having inner and outer tubes, for the conveyance of water therebetween, into the turbine;
   the inner and outer tubes of the annular chamber correspond to the inner and outer diameters of the turbine blades;
   the inlet port has an outside wall, an inside wall, a near end wall, and a far end wall;
   the inside wall of the inlet port merges into the inner tube of the annular chamber;
   the outside wall of the inlet port merges into the outer tube of the annular chamber;
   the annular chamber has a far wall, which is helical in configuration;
   the helical far wall spans radially between the inner and outer tubes of the annular chamber, and thereby closes off a far end of the annular chamber;
   the far end wall of the inlet port merges into the helical far wall of the annular chamber;
   the inner wall of the inlet port intersects the far wall of the annular chamber, along a line of intersection termed the inner-wall/far-wall intersection;
   the said inner-wall/far-wall intersection extends between the outer tube and the inner tube of the annular chamber;
   the guide-case includes an extension to the helical far wall;
   the extension extends beyond the said inner-wall/far-wall intersection in the downstream direction, helically towards the turbine; and
   the extension has a near side and a far side, and is arranged such that the extension is wetted on its far side by water entering the annular chamber from the near end of the inlet port, termed the near water, and is wetted on its near side by water entering from the far end of the inlet port, termed the far water.

2. Apparatus of claim 1, wherein the extension extends far enough downstream, with respect to the said inner-wall/far-wall intersection, as to keep the near water separated from the far water until the two waters are substantially equalised as to their velocity vectors, whereby the turbulence caused by their mixing is substantially reduced.

3. Apparatus of claim 1, wherein:
   the outer tube of the chamber and the near end wall of the inlet port intersect along a line of intersection termed the outer-tube/near-end-wall intersection;
   the inner wall and the far end wall of the inlet port intersect along a line of intersection termed the inner-wall/far-end-wall intersection;
   a point P52 is on the said outer-tube/near-end-wall intersection, halfway between the inner wall and the outer wall of the inlet port;
   a point P53 is on the said inner-wall/far-end-wall intersection, halfway between the outer tube and the inner tube of the chamber;
   a line P52-P53 joins the points P52 and P53; and
   the extension extends downstream at least as far as the line P52-P53.

4. Apparatus of claim 3, wherein:
   point P48 is a point that lies on all three of (a) the near end wall and (b) the outer wall of the inlet port, and (c) the outer tube of the chamber;
   point P49 is a point that lies on all three of (a) the far end wall and (b) the inner wall of the inlet port, and (c) the inner tube of the chamber;
   a line P48-P49 joins the points P48 and P49; and
   the extension extends downstream at least as far as the line P48-P49.

5. Apparatus of claim 1, wherein the combined length of the helical far wall of the chamber and the extension is at least one full helical turn.

6. Apparatus of claim 1, wherein:
   the extension has a downstream-extremity, being a line drawn between the outer tube and the inner tube, connecting the points on the extension that lie closest to the turbine;
   the downstream-extremity of the extension has an outer end at the outer tube, and an inner end at the inner tube; and
   the downstream-extremity of the extension lies in a plane that is normal relative to the annular axis, whereby the downstream-extremity lies on a straight normal radius of the annular chamber.

7. Apparatus of claim 1, wherein:
the extension is a right continuation of the helical far wall of the annular chamber; and
the helical far wall of the annular chamber has a constant helical lead angle, and that same lead angle is continued in the extension.

8. Apparatus of claim 1, wherein the helical far wall of the annular chamber has a flank angle of ninety degrees, and that same flank angle is continued in the extension.

9. Apparatus of claim 1, wherein:
the extension has a downstream-extremity, being a line drawn between the outer tube and the inner tube, connecting the points on the extension that lie closest to the turbine;
the downstream-extremity of the extension has an outer end at the outer tube, and an inner end at the inner tube; and
the extension is characterised by having no large hole, upstream of the downstream-extremity, being a hole through which the near water could mix with the far water.

10. Apparatus of claim 1, wherein:
the apparatus includes a brace, or spacer, which straddles across the inlet port, between the inner wall and the outer wall;
the brace, or spacer, is so structured as to hold the inner and outer wall steady, relative to each other, and to prevent distortion thereof;
the brace, or spacer, is so oriented as to minimise its resistance to the flow of water through the inlet port.

11. Apparatus of claim 1, wherein:
the turbine blades have radially-inner and radially-outer regions, and
the turbine and the guide-case have been so engineered that water entering the radially-inner regions of the turbine blades is rotating at a faster angular velocity than water entering the radially-outer regions of the blades.

12. The apparatus of claim 1, wherein:
the extension has a downstream-extremity, being a line drawn between the outer tube and the inner tube, connecting the points on the extension that lie closest to the turbine; and
the turbine blades are located very closely downstream of the downstream extremity of the extension.

13. Apparatus of claim 1, wherein the structure of the guide-case is such that the flow of water passing through the apparatus undergoes substantially no change in its velocity vectors, after leaving the extension and before entering the turbine blades.

* * * * *